A. F. WARD.
Tape-Measure.
No. 202,610.    Patented April 16, 1878.
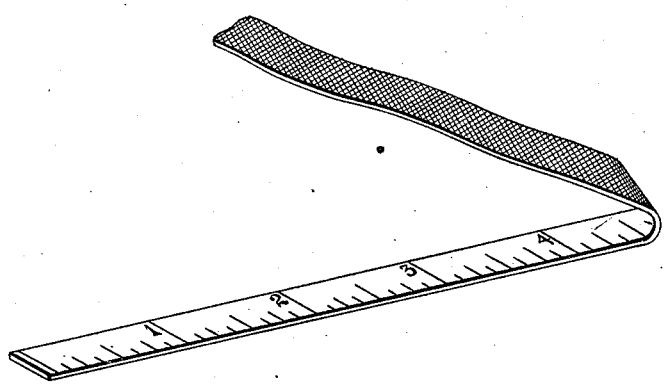
Witnesses,
Henry Howson Jr.
Harry Smith
Inventor
Asahel F. Ward
by his Attorneys
Howson Jr.

UNITED STATES PATENT OFFICE.

ASAHEL F. WARD, OF PHILADELPHIA, PENNSYLVANIA.

IMPROVEMENT IN TAPE-MEASURES.

Specification forming part of Letters Patent No. 202,610, dated April 16, 1878; application filed March 18, 1878.

*To all whom it may concern:*

Be it known that I, ASAHEL F. WARD, of Philadelphia, Pennsylvania, have invented a new and useful Improvement in Tape-Measure, of which the following is a specification:

The object of my invention is to make a flexible, water-proof, and durable tape-measures for the use of tailors, dress-makers, shoe-makers, &c.

Tape-measures of the class to which my invention relates are usually composed of closely-woven fabric, and are coated with paint or varnish for the purpose of rendering them impervious to moisture; but this paint or varnish detracts from the flexibility of the measure, and is liable to crack in time and to break off, so that it not only fails to perform its intended duty, but the graduations and figures are soon obliterated.

I make my improved measure of a fabric impregnated and coated with rubber—like the fabric used in the manufacture of the light-colored rubber overcoats, &c.—the coating of rubber being on one or both sides of the fabric, as desired. I take a strip of this fabric, which has no elasticity, but is very flexible, and print on the rubber surface, as shown in the drawing, the desired graduations and figures with ordinary printing-ink, which has such an affinity for the rubber that no bending or twisting of the measure will obliterate the marks or impair the surface in any way.

The measure, owing to its flexibility, is especially adapted for use by tailors, dress-makers, shoe-makers, &c. Moisture has no injurious effect on it, and it can be washed without receiving any injury.

I claim as my invention and as a new manufacture—

A non-elastic tape-measure composed of a fabric impregnated and coated with rubber, and having figures and graduation-marks printed on its rubber surface, all as set forth.

In testimony whereof I have signed my name to this specification in the presence of two subscribing witnesses.

A. F. WARD.

Witnesses:
HARRY A. CRAWFORD,
HARRY SMITH.